United States Patent
Breveglieri

(10) Patent No.: US 9,080,560 B2
(45) Date of Patent: Jul. 14, 2015

(54) HYDRAULIC MOTOR OR PUMP WITH TANGENTIAL PISTONS WITH ANNULAR OR SECTIONAL SHAPE ON ORDINARY OR PLANETARY GEAR FOR HIGH TORQUE, AND POWER PERFORMANCE AND HYDRAULIC AND MECHANICAL EFFICIENCY

(75) Inventor: Alessandro Breveglieri, Casalecchio di Reno (IT)

(73) Assignee: SOILMEC S.p.A., Cesena (FC) (IT)

( * ) Notice: Subject to any disclaimer, the term of this patent is extended or adjusted under 35 U.S.C. 154(b) by 779 days.

(21) Appl. No.: 13/342,514

(22) Filed: Jan. 3, 2012

(65) Prior Publication Data

US 2012/0237383 A1    Sep. 20, 2012

(30) Foreign Application Priority Data

Jan. 3, 2011    (IT) .............................. BO2011A0001

(51) Int. Cl.
| | |
|---|---|
| *F04B 1/00* | (2006.01) |
| *F16H 47/04* | (2006.01) |
| *F04B 9/02* | (2006.01) |
| *F04B 53/10* | (2006.01) |
| *F01C 17/02* | (2006.01) |

(52) U.S. Cl.
CPC . *F04B 1/005* (2013.01); *F04B 9/02* (2013.01); *F04B 53/10* (2013.01); *F16H 47/04* (2013.01); *F01C 17/02* (2013.01)

(58) Field of Classification Search
USPC .......... 475/31, 32, 91, 146, 147, 162; 91/197, 91/491
See application file for complete search history.

(56) References Cited

U.S. PATENT DOCUMENTS

| | | | | |
|---|---|---|---|---|
| 1,341,332 | A | * | 5/1920 | McDonald ...................... 91/160 |
| 2,029,118 | A | * | 1/1936 | Patterson ...................... 475/116 |
| 3,357,364 | A | | 12/1967 | Ellis |
| 3,577,830 | A | | 5/1971 | Ortelli |

(Continued)

FOREIGN PATENT DOCUMENTS

| | | |
|---|---|---|
| CA | 1075080 | 12/1975 |
| EP | 0 152 509 | 8/1985 |

(Continued)

OTHER PUBLICATIONS

Italian Search Report for Italian Application No. BO 2011 A 00001 mailed Nov. 11, 2011.

*Primary Examiner* — Justin Holmes
(74) *Attorney, Agent, or Firm* — Merchant & Gould P.C.

(57) ABSTRACT

A hydraulic motor or pump includes eccentric shafts arranged in a planet position with respect to the output shaft, subject to the action of two propelling members for each shaft, which are arranged in a tangential position with respect to the output shaft and act on intermediate planetary fixed parts alternated with the shafts. The propelling members receive flow of pressurized fluid regulated by rotatory openings, which connect the propelling members to the pressure circuit or to the discharge one. The motor can be connected, through the eccentric shafts, to ordinary or planetary gearings. The gearing presents an actual piston displacement and one or two different equivalent piston displacements. The shape of the motor is annular, or sectoral, with a circular open space available inside the motor for different applications. The number of the planet shafts has no limits, since they independently transmit the torque-allowing annular shapes of any size.

11 Claims, 14 Drawing Sheets

(56) References Cited

U.S. PATENT DOCUMENTS

| | | | |
|---|---|---|---|
| 3,656,405 A | * | 4/1972 | Klinkhammer ................. 91/176 |
| 3,823,697 A | * | 7/1974 | Von Esch .................... 123/43 R |
| 3,939,808 A | * | 2/1976 | Kostecki et al. ........... 123/43 R |
| 4,109,618 A | * | 8/1978 | Daniels ....................... 123/43 C |
| 4,166,438 A | * | 9/1979 | Gottschalk ................. 123/43 R |
| 4,530,316 A | * | 7/1985 | Morrison .................... 123/44 R |
| 4,974,496 A | * | 12/1990 | Apgar ............................ 91/491 |
| 5,365,892 A | * | 11/1994 | Kienle ........................ 123/44 D |
| 5,382,140 A | * | 1/1995 | Eisenbacher et al. ......... 417/273 |
| 2009/0155095 A1 | * | 6/2009 | Gollner ......................... 417/273 |

FOREIGN PATENT DOCUMENTS

| | | |
|---|---|---|
| GB | 166644 | 4/1920 |
| GB | 651834 | 2/1947 |
| GB | 1 385 693 | 2/1975 |

\* cited by examiner

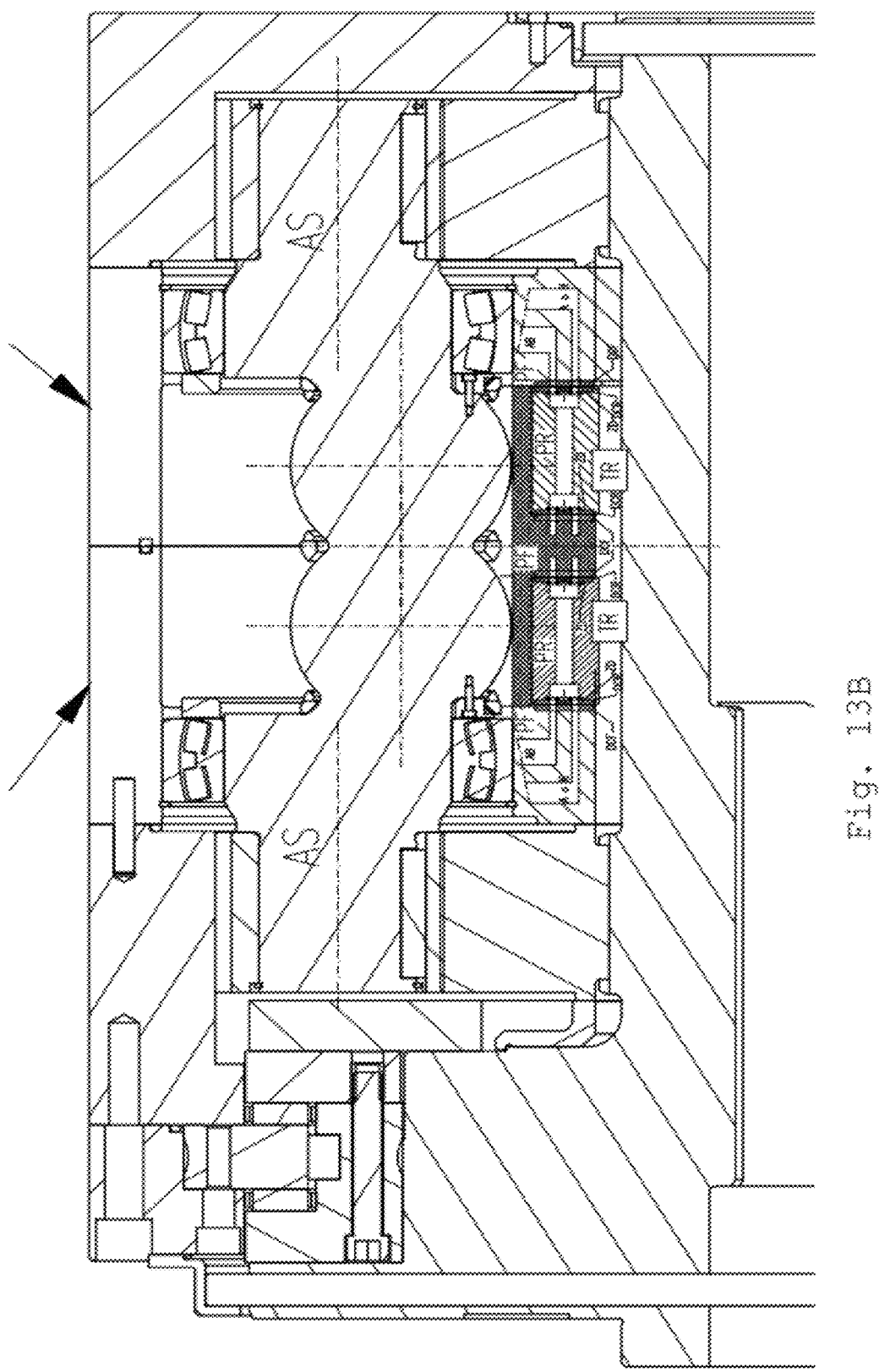

HYDRAULIC MOTOR OR PUMP WITH TANGENTIAL PISTONS WITH ANNULAR OR SECTIONAL SHAPE ON ORDINARY OR PLANETARY GEAR FOR HIGH TORQUE, AND POWER PERFORMANCE AND HYDRAULIC AND MECHANICAL EFFICIENCY

This application claims benefit of Serial No. BO2011A000001, filed 3 Jan. 2011 in Italy and which application is incorporated herein by reference. To the extent appropriate, a claim of priority is made to the above disclosed application.

BACKGROUND

Hydraulic motors or pumps currently available are of the type with radial or axial pistons and generally consist of a piston body, which acts on a rotatory eccentric shaft, which is inner in the case of the radial shape or rear in the case of the axial shape, whether the pistons of the piston body are straight or inclined. Said machines are adapted to convert the alternating motion of the pistons into the rotatory motion of the shaft with very high operating torques and pressure and can be used both as pumps and as motors in several activities of the construction industry. They all present the drawback that no equipment or apparatus of other associated machines is allowed to be arranged inside of them or pass through them. In these applications, generally on ordinary or planetary reduction gears, it is necessary to move the motor or pump to a position that is arranged on the side of the axis along which the torque is used, and to place it on a specially provided reduction gear, thus causing a consequent increase in the space needed and in manufacturing costs as well as a dispersion of power and, therefore, a decrease in mechanical efficiency. The object of the present invention is to provide a machine, in which the actuating pistons are arranged in a position that is tangential with respect to the rotation axis of the shaft that transmits the torque, thus allowing the creation of any kind of inner free space for the uses needed. Said pistons act on shafts that are arranged in a planet position with respect to the driving shaft and, in turn, transmit said torque by means of gearings, which can be of the ordinary or planetary type. The following description is relative to a motor with a number of 3 planets, but it also equally applies to a higher number of planet positions.

BRIEF DESCRIPTION OF THE DRAWINGS

Further details will be explained in the following description with reference to the accompanying drawings, which show what follows:

FIGS. 13a and 13b show the portions of the motor of FIG. 10 in which the hydraulic distribution of FIGS. 12a and 12b is highlighted.

DETAILED DESCRIPTION

Figure 1:
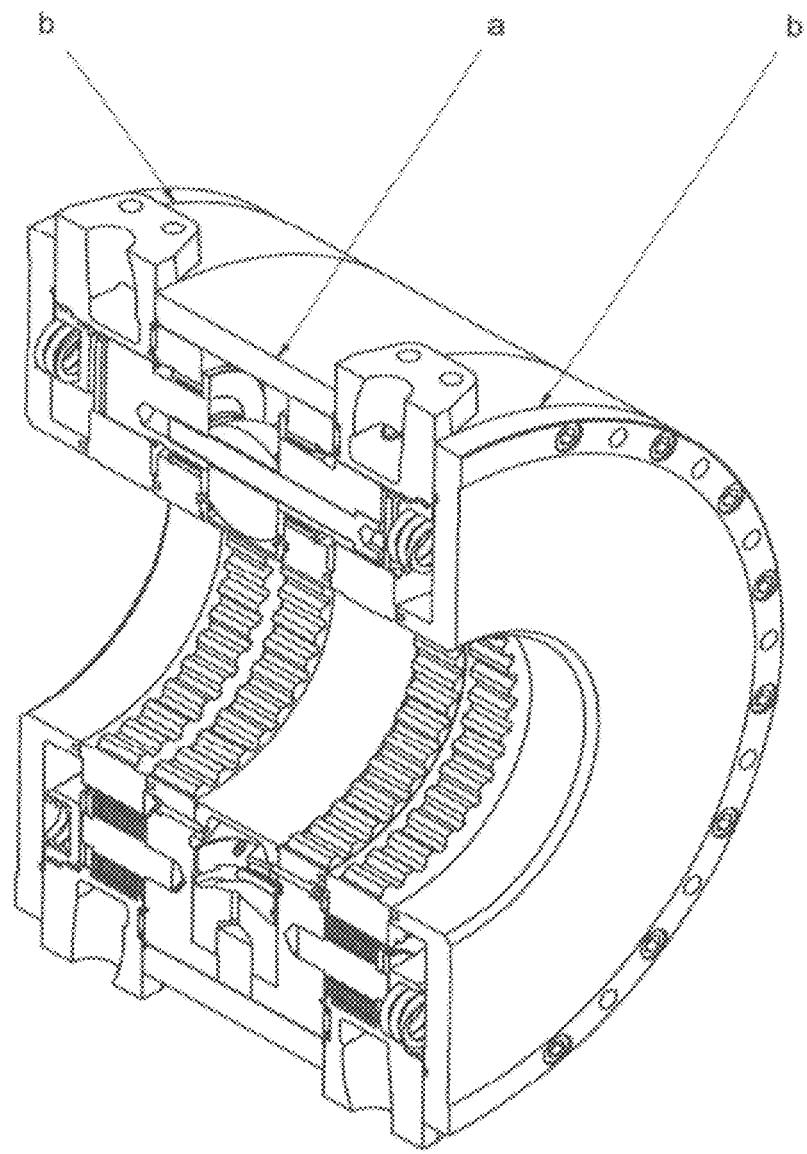
FIG. 1: An overall view, in a longitudinal section, of the motor/pump on planetary gearing in the solutions according to the present invention.
Figure 2:
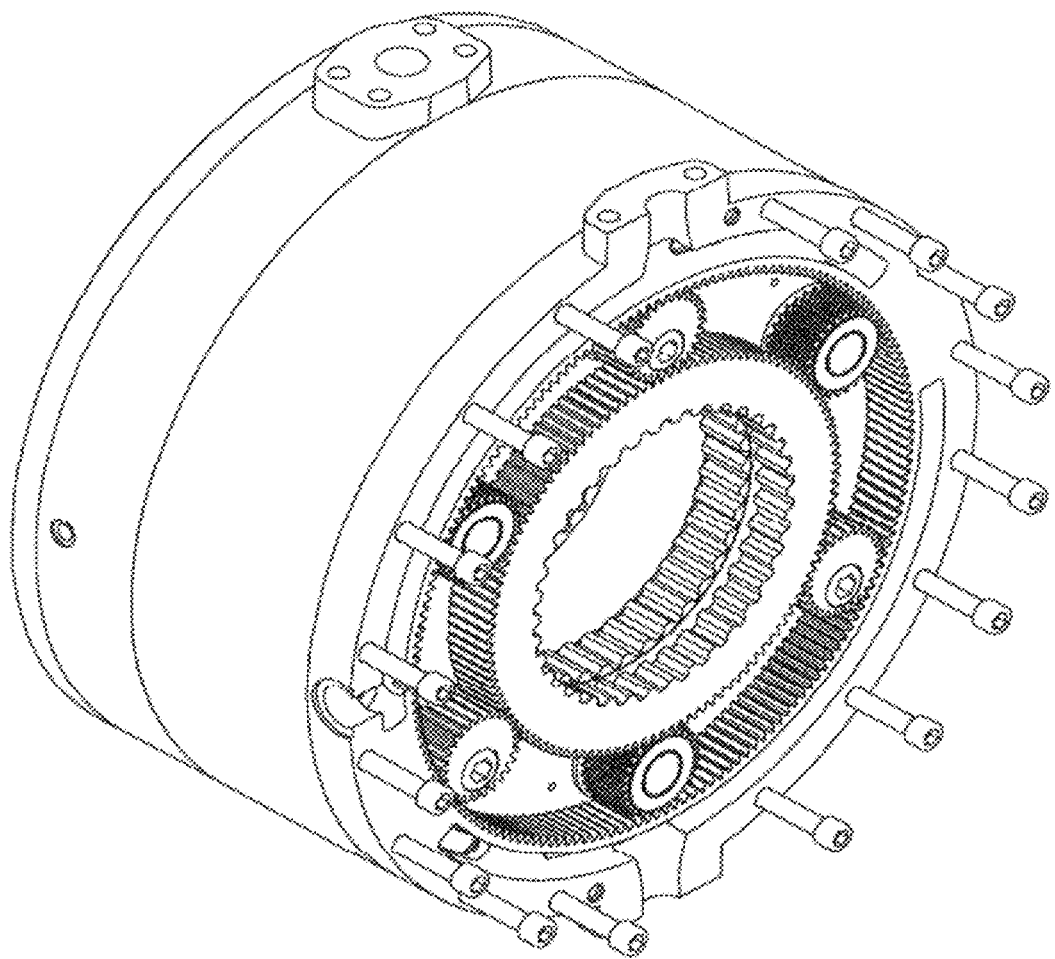
FIG. 2: The same motor/pump on planetary gearing seen in the area of the lateral gearing.
Figure 3:
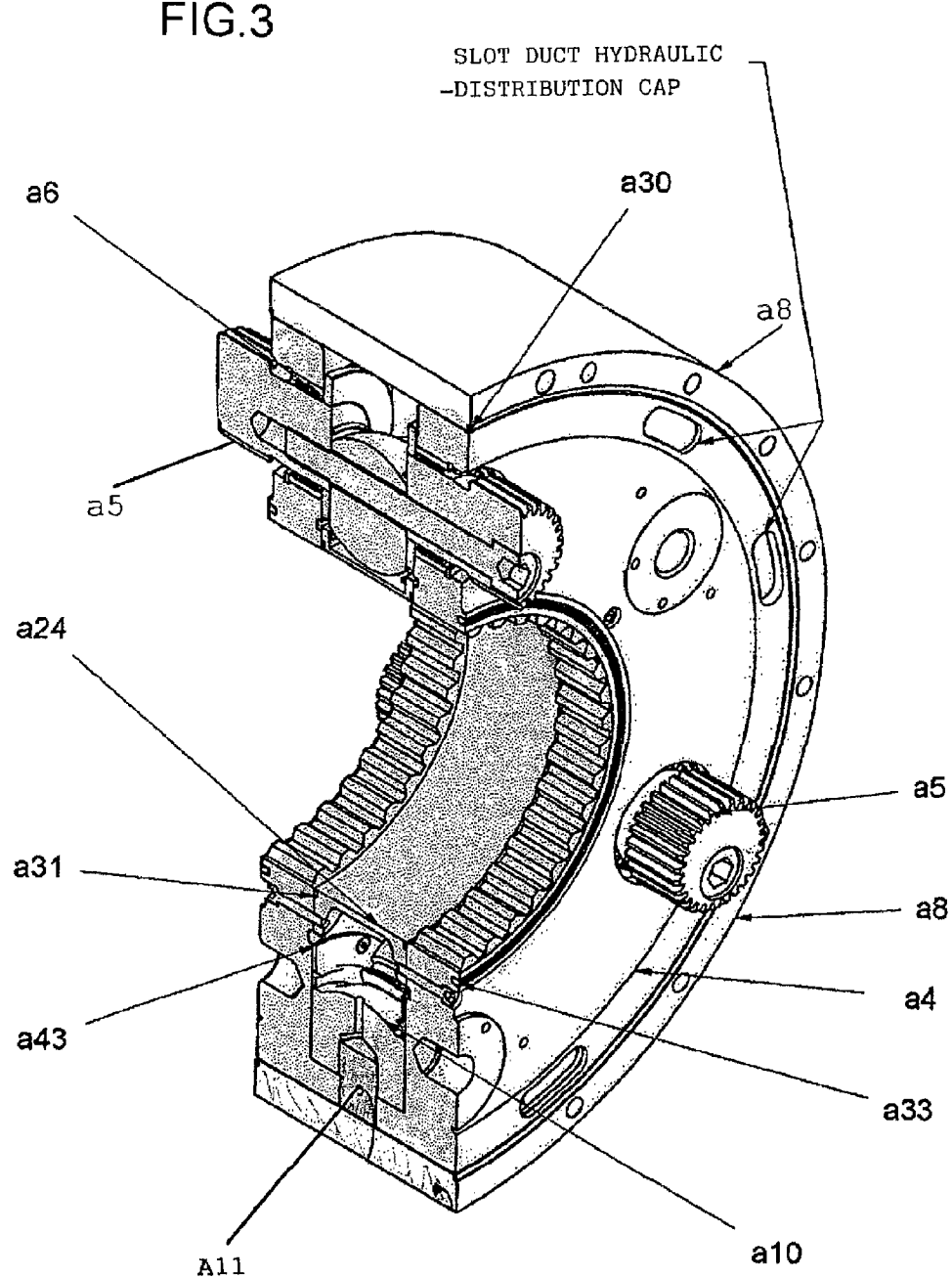
FIG. 3: A view, in a longitudinal section, of the central sub assembly, where the propelling members and the planet driving shafts are located in the solutions according to the present invention.
Figure 4:
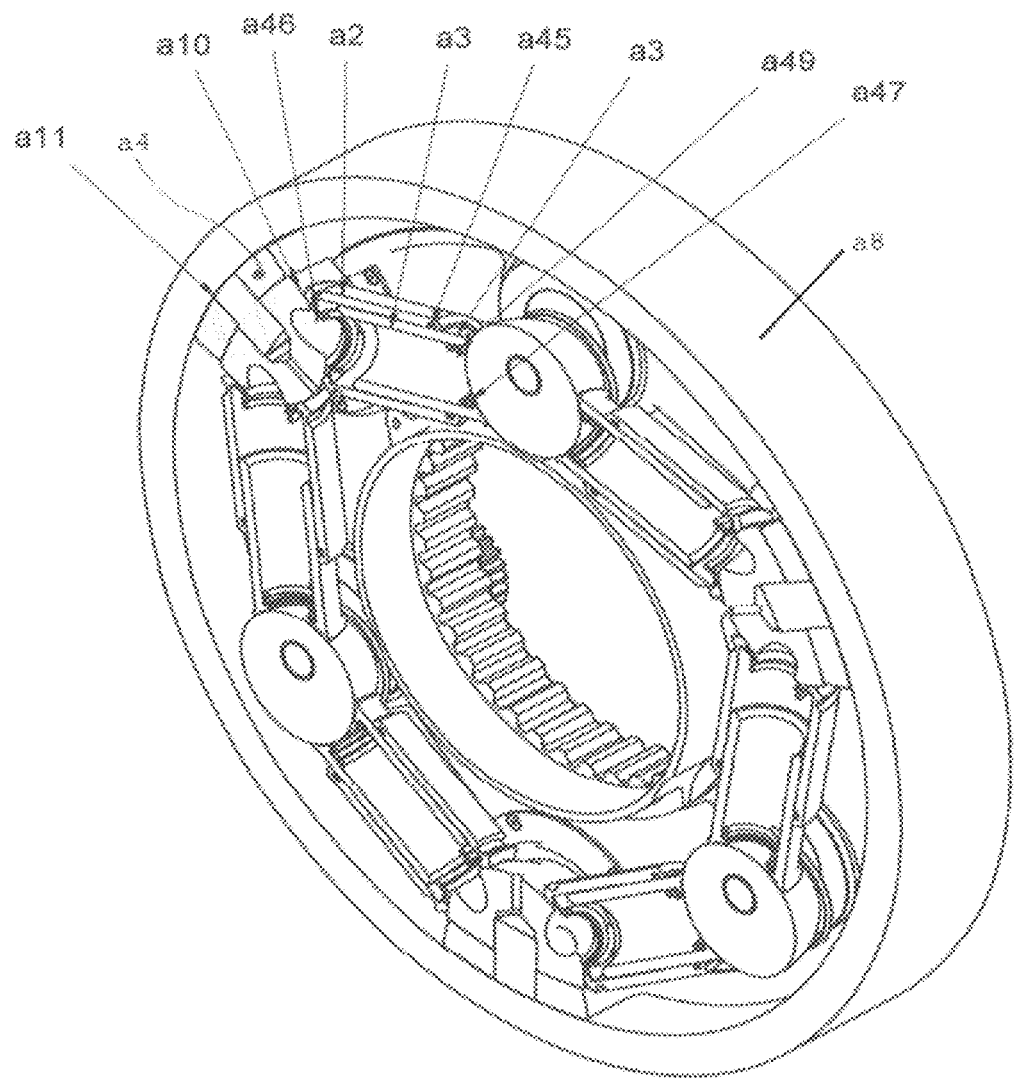
FIG. 4: The same sub-assembly of FIG. 3, but seen in a transverse section in the medium shot of the propelling members.

As shown in FIGS. 1 and 2, which are relative to the invention on planetary gearing (the numbering of the parts is not sequential, but it is univocal), the motor/pump substantially consists of 3 sub-assemblies: a central sub-assembly (a), where the actuating pistons are located and from which the planets protrude; at the two ends there are arranged the gearing (b), namely the outer fixed and the inner gearings, which transmit the motion. These parts also comprise, if necessary, the braking organs, which present multiple discs of the axial and planet type. The gearing has an outer fixed gear and two degrees of freedom: one relative to the planet carrier and one relative to the inner gears. Therefore, the motor/pump according to the present invention has an actual piston displacement, which is determined by the pistons, and two equivalent piston displacements, one for each degree of freedom. The first sub-assembly (a), as shown in FIGS. 3 and 4, consists, in the case of 3 planets, of 3 planet shafts (a5), of 6 pistons (a3) and 6 cylinders (a2), two for each planet, of 3 fixed caps (a10), which are anchored to the casing (a4) by means of a pin (a11) and react to the thrust of the actuators, and of all the organs associated thereto (a43-a45-a46-a47-a49). The working technique of the propelling members is a known technique, which is implemented in some types of motors with radial pistons, which are currently available on the market (U.S. Pat. No. 3,577,830 e Patent number EP0152509).

Figure 9:
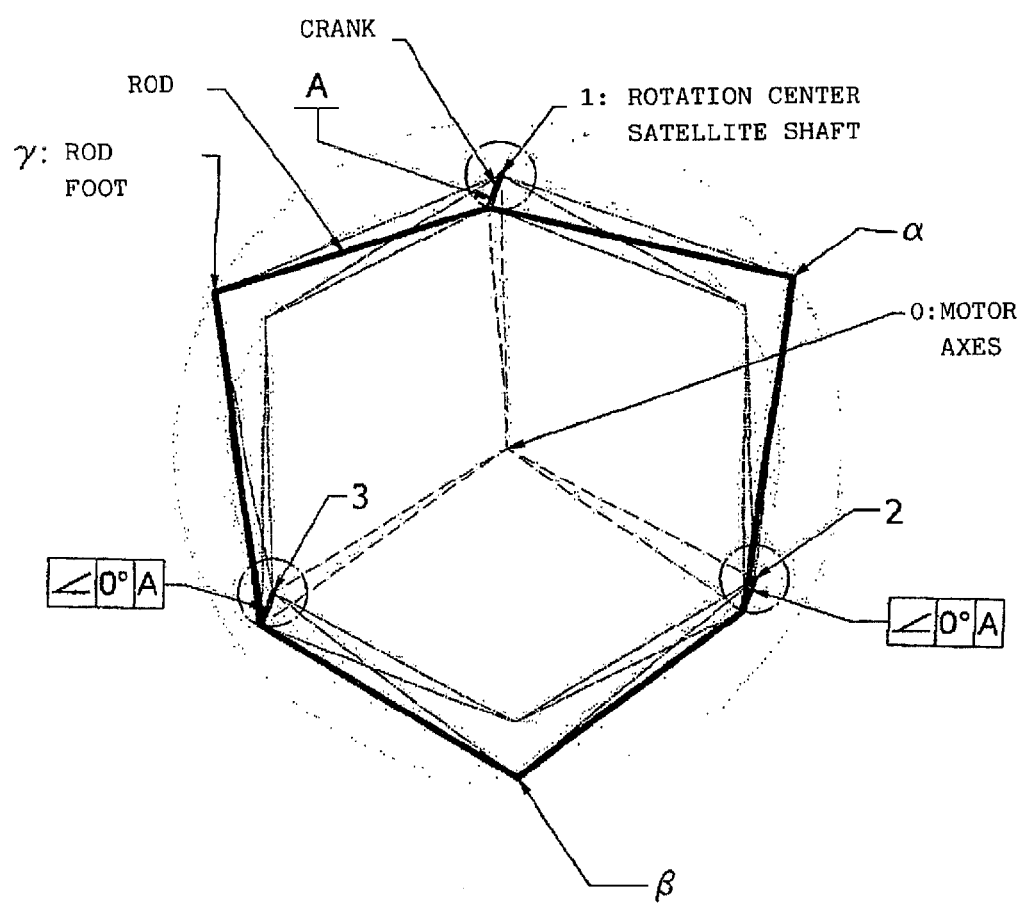
FIG. 9: The kinematic diagram of the propulsion shown in FIG. 4.

Since the torque generated on each shaft has a variable value, in order to minimize the torque variation, the angular positions of the eccentricities of the planets that are in phase with each other are arranged as shown in FIG. 9, in this specific case in a 0° phase, namely parallel to each other. The shafts, in turn, mesh with the fixed gear (b11) and with the driven gear (b22), thus obtaining what described above and allowing the transmission of the torque.

Everything is contained in the planet carrier body (a4), which also houses the holes that lead the propelling fluid from the outside to the caps (a10) and from the latter to the propelling members (a2-a3). The planet carrier body (a4) is a driven gear and transmits the rotatory torque with a given gear ratio with respect to the planets (a5), which are driving gears. Everything is closed by an outer fixed lid (a8) and by an inner rotatory lid (a24), which is connected to the planet carrier (a4), both lids being provided with respective sealing devices (a30-a31-a33).

Starting from the observations concerning said motors, which are associated to the epicyclic gearing described, in order to obtain a correct hydraulic distribution, besides considering the known relations of said gearings, taking into account the compatibility of the number of planets with the toothing of the outer and inner planet carrier, and making sure of the correct relative angular position of the eccentricity of the shafts, which has to be equal to 0° to guarantee an optimal torque composition, it is necessary, in case of an outer fixed gear, to correlate the number of teeth of the outer gear ($z3$) and the number of teeth of the planet shaft ($z2$) with the number of planets (nsa), namely (with $z3>0$ e $z2>0$)

$$z3/z2 = nsa*x+1$$

wherein x is an integer=>1.

In case of an inner fixed gear, it is necessary to have:

$$z1/z2 = nsa*x+1$$

wherein x is an integer=>1.

This means that, in both cases, the relative gear ratio between planet and planet carrier has to be $$ws'/wp = abs[nsa*x+1],$$

wherein w' indicates the angular velocity of the planet relative to the planet carrier and wp is the velocity of the planet carrier.

Figure 5:
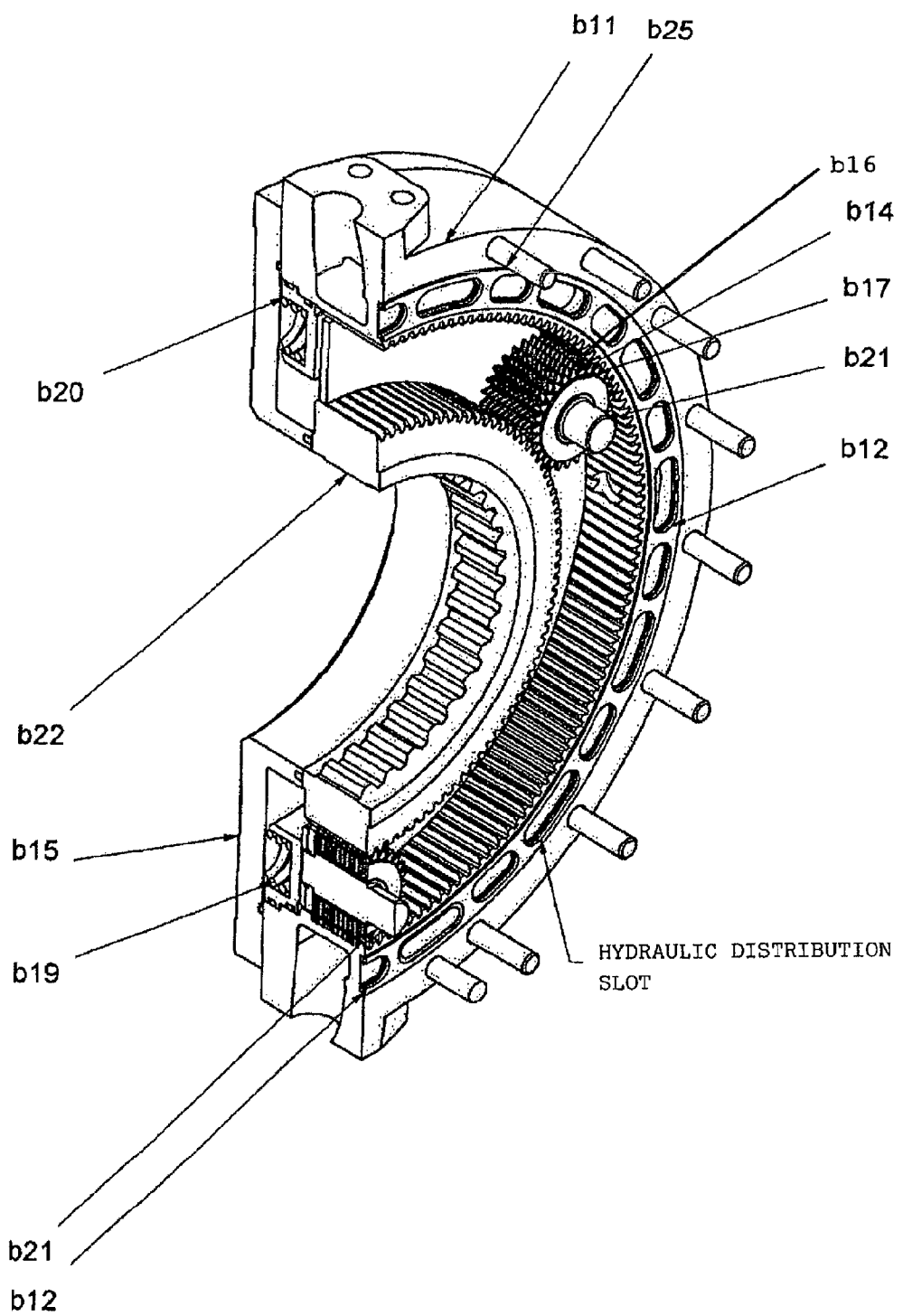
FIG. 5: A view, in a longitudinal section, of the lateral sub-assembly, where the gearings, the hydraulic distribution, and the braking devices are located.

The two lateral sub-assemblies (b), as shown in FIG. 5, are equal to each other and are made up of outer fixed gears (b11), which present an inner toothing and are connected to each other by the outer lid (a8) described with reference to the first sub-assembly, and of two inner driven gears (b22), which are all connected to the planets (a5), which are moved by the propelling members. This epicyclic gear represents a known technique and the gear ratios relative to the number of teeth that make up the fixed gear, the planets and the inner gear are known, as well. The gear ratio between the planets and the planet carrier is a known technique.

Said sub-assembly houses those devices adapted for the hydraulic distribution (b12) of the fluid from the feeding or discharge duct to all the propelling members. This designing solution is based on a geometry that represents a known technique and is of the type used in motors with radial pistons and outer cams, which are currently available on the market (see Patent number GB1385693 published on 26-02-1975 and Patent number CA1075080 published on 08-04-1980 of other inventors).

The above-mentioned sub-assemblies house the braking devices, which are preferably of the negative type, which means that they only operate in the absence of pressure. They consist of a central hydraulic cylinder (b20), which is connected to the feeding system of the motor and takes away the braking action in the presence of a minimum pressure in the motor, of one or more planet devices made up of a pack of braking discs and counterdiscs (b14-b16), which are connected to the fixed gear by means of a toothing, and of a central disc-carrier device (b21), which is anchored to the planet carrier (a4). The solution according to the present invention allows the user to obtain a multiple braking action; the planet packs of discs act between the fixed gear (b11) and the planet carrier (a4), thus directing the braking action onto the planet carrier (a4) through the disc-carrier device (b21) and onto the inner gear (b22) connected to the fixed gear through the pack of discs.

The thrusts produced by the fluid under pressure and those produced on the braking discs by the springs (b19) are axially balanced between the two sub-assemblies (b) arranged on the side of the sub-assembly (a), since they act on each other with an equal and opposite intensity.

Figure 6:
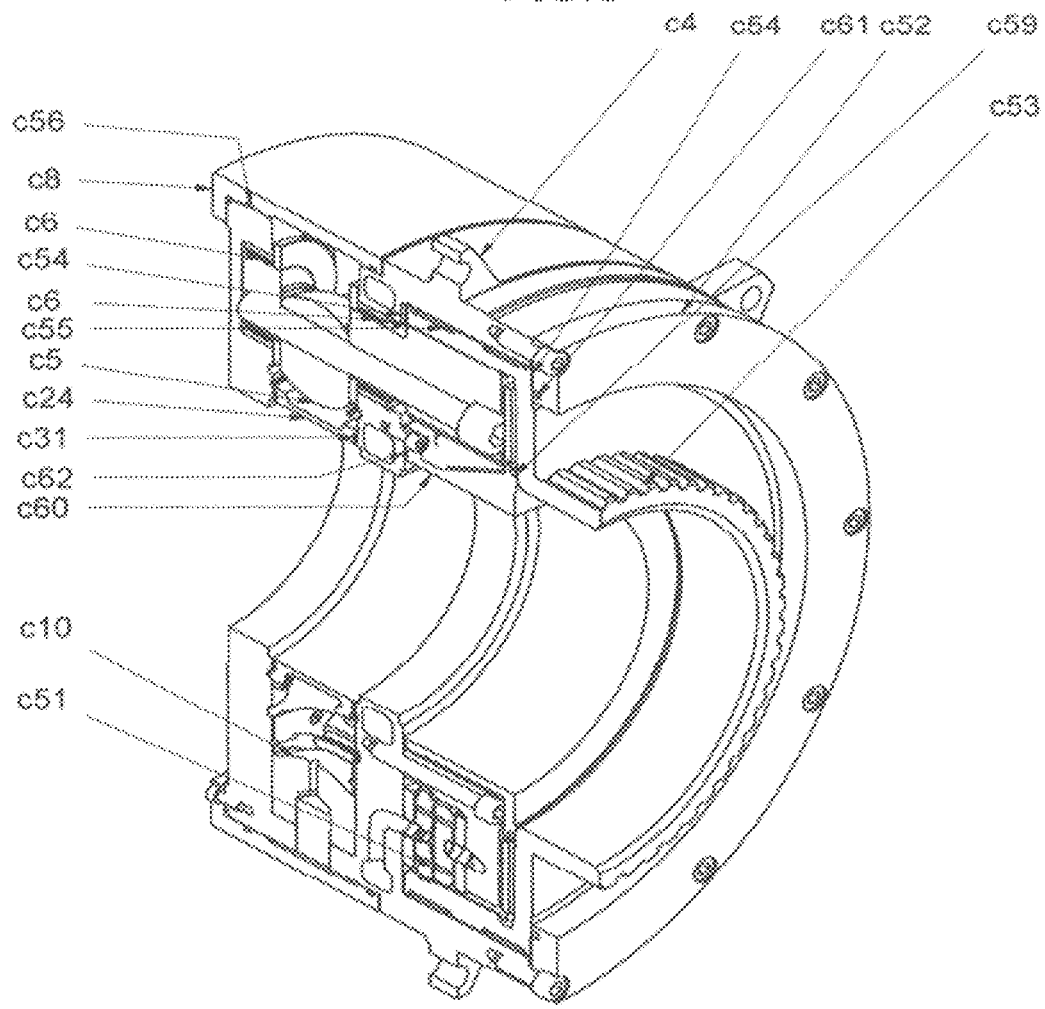
FIG. 6: An overall view, in a longitudinal section, of the motor/pump on ordinary gearing in the solutions according to the present invention.
Figure 7:
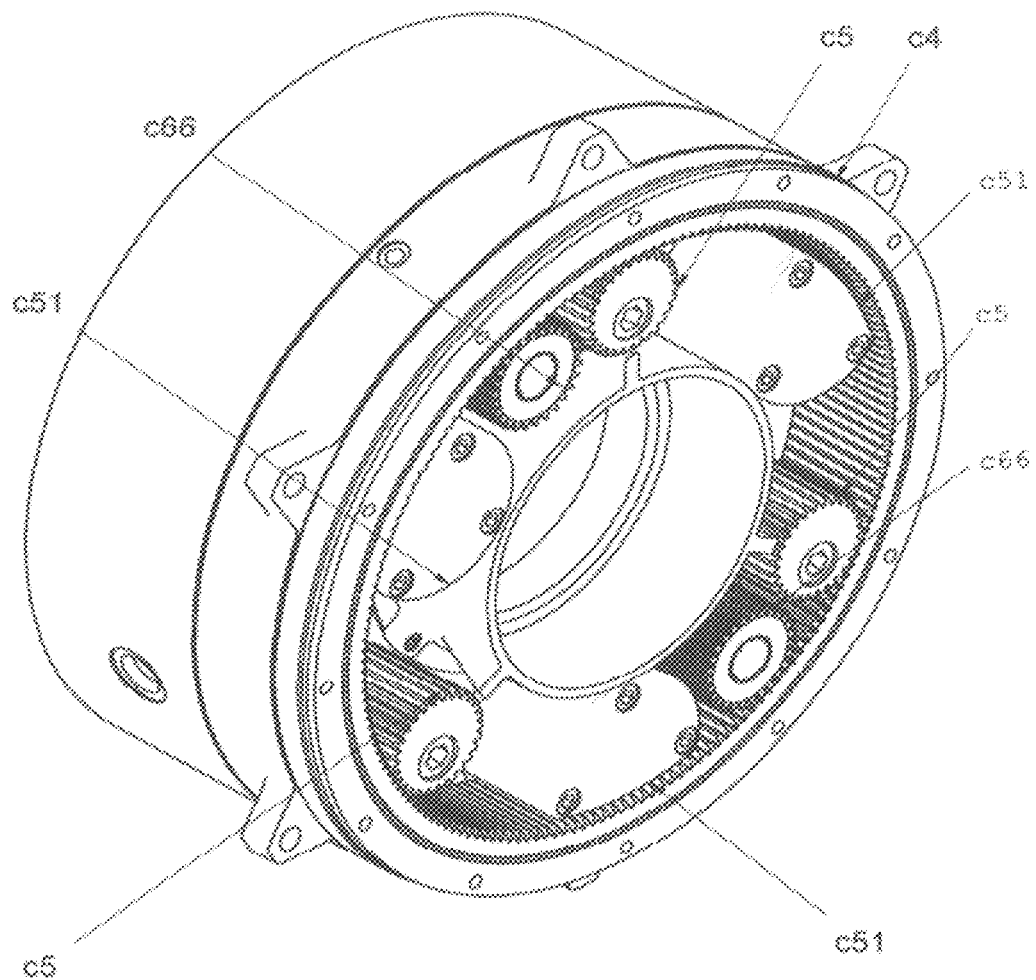
FIG. 7: A view of the motor/pump on ordinary gearing in the area where the gearings, the hydraulic distributors, and the braking devices are located.

The invention on ordinary gearing, instead, as shown in FIGS. 6 and 7, consists of a motor/pump, which is equal to the previous one and, as already described above, as sub-assembly (a), which, in this case, presents a fixed body and houses the actuating pistons as well as the shafts arranged in a planet position, which mesh with the driven gearing (c53), which transmits the motion.

The gear ratio as a function of the number of teeth is a known technique. Therefore, the motor/pump according to the present invention has an actual piston displacement, which is determined by the pistons, and an equivalent piston displacement, which is relative to the driven shaft.

These gearings of the ordinary type also need to observe the relation between the number of planets and the number of teeth of the gears themselves, particularly in the presence of two driven gears; moreover, it is also necessary to take into account the known compatibilities as well as the angular positions of the eccentricities of the planets that are in phase with each other, which have to be arranged as shown in FIG. 9, namely in a 0° phase, i.e. parallel to each other. On the contrary, no further specific gear ratio has to be defined.

In this version of the motor/pump, those devices (c51) that are adapted for the hydraulic distribution of the fluid from the feeding or discharge duct to all the propelling members are arranged in a planet position and in correspondence to the caps. This type of motor/pump is conceptually similar to those currently available on the market and installed on radial pistons. The solution shown, instead, is the subject-matter of a separate patent identified by number BO2011A000002, which has been filed on Mar. 1, 2011 by the applicant.

Figure 8:
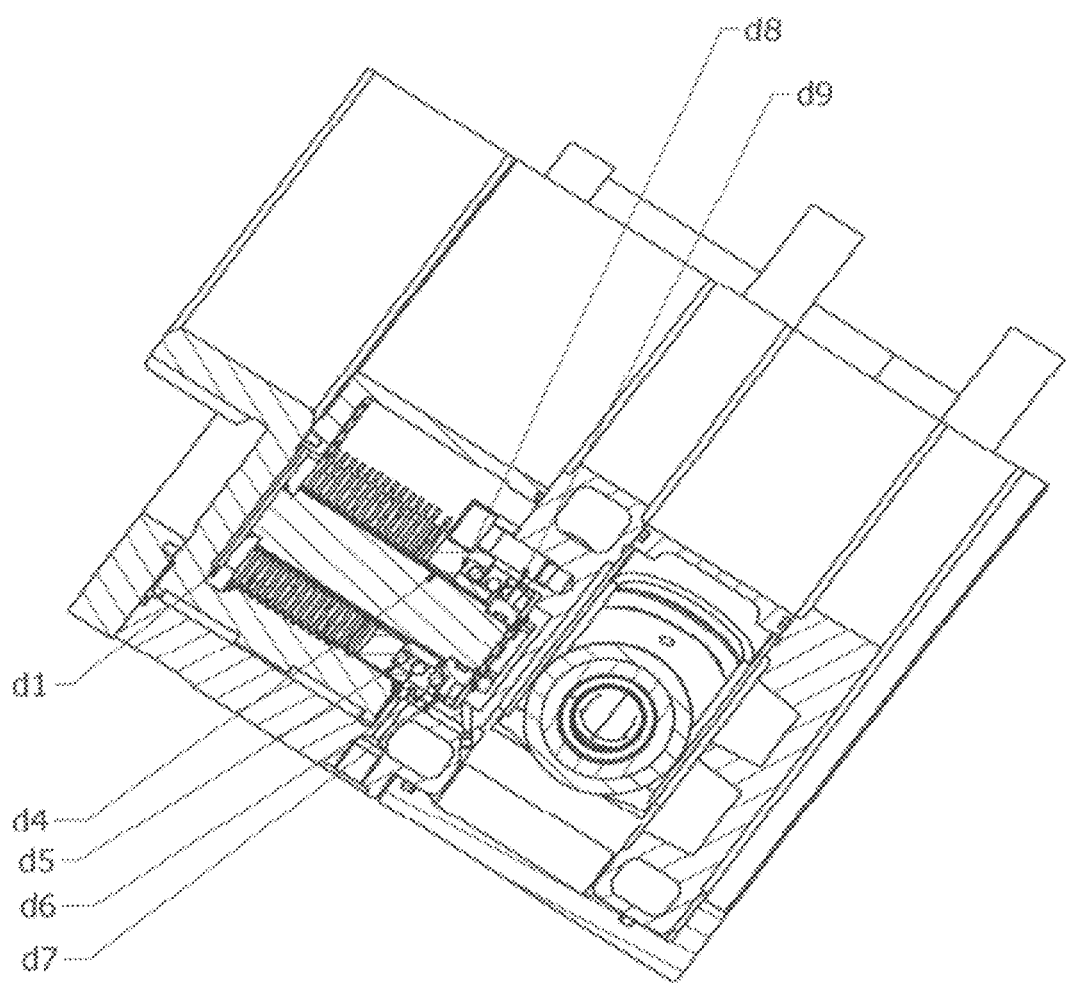
FIG. 8: A longitudinal section of the multi-disc braking device arranged in a planet position of the motor/pump on ordinary gearing.

A planet position is assumed, if necessary, by the braking devices (c66), which are preferably of the negative type, which means that they only operate in the absence of pressure; each one of them, as shown in FIG. 8, is made up of a hydraulic cylinder (d6), which is connected to the feeding system of the motor and, in the presence of a minimum pressure in the motor, neutralizes the action of the springs (d5), of its sealing organs (d7-d9), of a lid (d4) and a spacer (d8), of a pack of braking discs (d2) and counterdiscs (d3), which are connected to the driven gear by means of a toothing, and of a central disc-carrier device (d1), which is anchored to the driving body.

Everything, as shown in FIG. 6, is supported by rolling or sliding organs (c54-c55), which are both axial and radial and control the axial and lateral position of the gearing, and by the sealing devices (c59-c61-c62-c31-c56), which are adapted to prevent fluid from flowing out of the machine.

The number of planets has no limits: each motor, if it is annular, can have, as a function of the diameter or of inner free hole to be obtained, a given number of planets, a given number of caps and twice as many propelling members, as a function of the average circumferential space available; this aspect is functional, since the planet is the driving organ.

One of the main features of these motors is that of presenting feeding and discharge ducts that are very close to the propelling members, as in motors with axial pistons. This determines the possibility to obtain very high speeds and mechanical efficiencies.

All the necessary requirements are met in order to obtain speeds and efficiencies that are equal to those of the currently available motors with axial pistons, unlike the motors with radial pistons, which are low-speed motors. Therefore, user can enjoy both the large piston displacements of the motors with radial pistons and the high speeds and efficiencies of the motors with axial propelling members.

As clearly described above, both the version shown in FIGS. 3, 4 and 5 for a planetary gearing and the version shown in FIGS. 6 and 7 for an ordinary gearing present a part of the hydraulic distribution that is at least partially rotatory with respect to the planet carrier body (a4). As a matter of fact, FIG. 5 shows that the devices adapted for the hydraulic distribution (b12) present a relative movement with respect to the body (a4). Similarly, FIGS. 6 and 7 show that the devices (c51) adapted for the hydraulic distribution present a relative movement with respect to the body (a4).

The braking devices, in both embodiments, are of the negative or positive type. The term positive or negative refers to the braking action. The braking action is negative if, in the absence of hydraulic pressure in the control cylinder, the brake is released and the springs or elastic striker means determine the thrust on the discs and counterdiscs. The positive baking action is the exact contrary. These are two different functional uses of the brakes. The disc brakes of cars are positive, while the safety brakes of wheel motors are negative.

In another version of the image shown in FIG. 5 and described above, the epicyclic gearing fixes the inner gear (b22); as a consequence, the planet carrier (a4) and the outer gear (b11) are caused to rotate as driven gears. In this case, the lateral lids of the whole motor are rigidly connected to the inner gear; said lids present the anchoring holes for the anchoring of the equipment to the frame as well as the feeding mouths for the feeding of the fluid, which will have to be connected to the hydraulic control unit. Obviously, the hydraulic distribution is in the inner annular part of the planet carrier that is more directly close to the position of the feeding mouths themselves, which are arranged in the fixed part.

The solution according to the present invention is adapted to be applied to machines that require large passages therein as well as high torques, such as the rotation heads or rotaries of hydraulic drilling machines. As a matter of fact, they need the annular band to take up the smallest radial space possible, so as to be able to drill close to pre-existing structures (minimum "front of wall"); moreover, they also need a large inner passage, which is preferably circular, to be left free, so as to allow the use of telescopic Kelly bars and/or of bars with a large diameter, which are used in some special technologies, such as the full piston displacement pile. The rotaries that are currently being produced normally are mechanical devices, which are made up of one or more hydraulic motors, preferably of the fast type (with axial pistons), and are provided with reduction gears, which are coaxial to the motor itself and, in turn, are connected to a driven gear, which, thanks to appropriate means, causes the bars and the digging tools to rotate.

In other versions, the fast motors are replaced by slow motors of the radial type, which, thanks to the use of large piston displacements, can be directly connected to the driven gear, without the need to install reduction gears. Even in this case, though, the motor/s has/have to be arranged in an eccentric position with respect to the rotary axis, so as to allow the creation of a free central passage. In this way, the rotaries end up having very large radial sizes, which involve problems that are connected either with the "front of wall", which ends up being too high, or, in an opposite manner (when the motors are mounted on the inside instead of on the outside), with the distance between the vertical guide antenna of the sliding rotary and the digging axis, which also ends up being too high, thus compromising the stability of the machine.

Since the inner driven ring has to have high torques and low velocities and the motors generating the torque have to presents a small piston displacement and have to be of the fast type, there have to be high reduction ratios in the transmission with large spaces taken up both in the radial direction and, especially, in the axial direction, with very high heights that can limit the sliding travels of the rotaries and, therefore, the actual digging depths. Vice versa, the use of radial motors involves smaller spaces taken up in the axial direction, but, due to their large diameters, they need the rotary to assume very large radial sizes, thus generating the consequent problems that have already been discussed. Furthermore, the piston displacement ratio of hydraulic motors is not always sufficient to fulfill the need for variations in the performances, thus determining the need for speed changes. In the rotary comprising the solution according to the present invention, namely the tangential motor, the latter can be built around the inner part, irrespective of the space that said inner part takes up. The reduced radial size, thanks to the sole presence, in the radial direction, of the propelling members and thanks to their angular oscillation around the spherical caps, allows a reduction of the "front of wall" and also reduces the problems connected with the space taken up during transportation and with the stability of the machine. Furthermore, the axial compactness allows the travel of the rotary to be increased, thus increasing the digging depth. The tangential motor is of the slow type and, with a simple gear ratio, it adjusts to the functional performances of these equipments.

Figure 10:
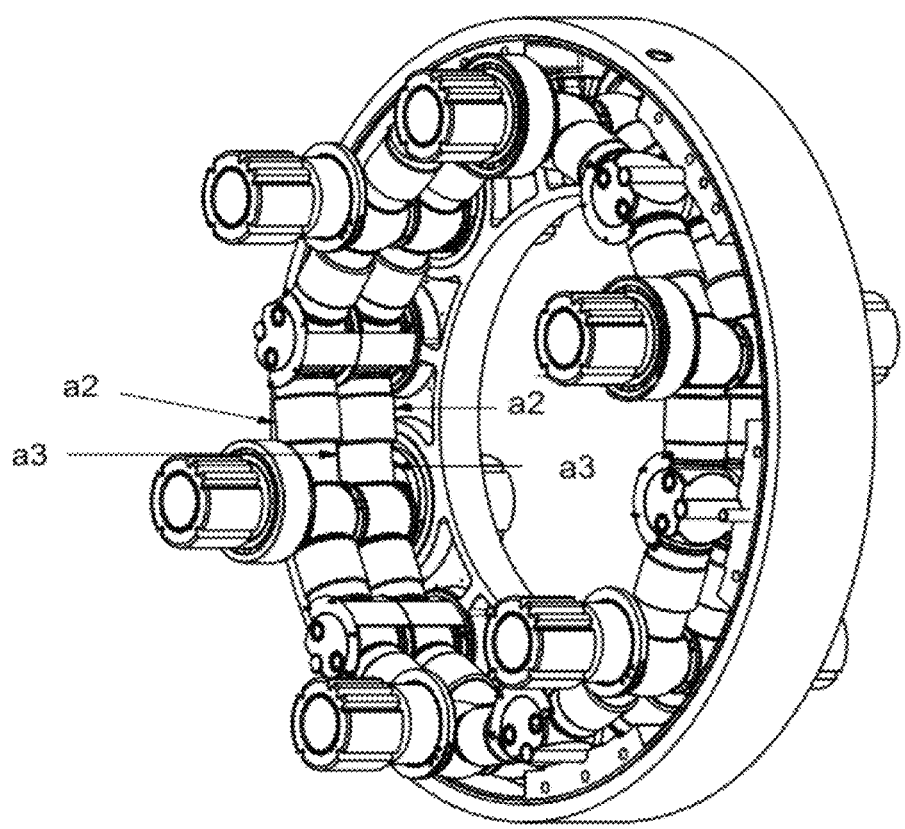
FIG. 10 shows the motor according to the present invention in an embodiment having 6 eccentric shafts and 24 cylinders.

In order to reduce the radial size of the ring with respect to the actual piston displacement, the solutions according to the present invention can be applied on different levels of propelling members, for example two levels, as shown in FIG. 10, which illustrates a solution, which is preferred but not binding, with 6 eccentric shafts (a5) and 24 cylinders, 12 cylinders (a2-a3) arranged on one level and 12 cylinders (a2' e a3') arranged on a second parallel level. The eccentric shaft (a5) is provided with two spherical seats, one coplanar to each cylinder level, which are adapted to receive the thrust of the cylinders. During their rotation, said seats can be angularly in phase with each other; the solution shown in the figure is in phase with a 0° angle, thus determining two piston displacements, which are coupled to each other and present an independent operation; each one of them is able to work both in a separate and in a coupled manner. This feature turns out to be particularly useful in those applications in which there have to be performances that can vary within a wide operating range. If the flow of pressurized/discharge fluid is supplied in a separate manner to given fractions of thrust cylinders, different piston displacements can be obtained from the same motor. Therefore, there will be propelling members which, in the necessary phases, will be connected to the pressurized and discharge circuit, and there will also be other propelling members which will be connected only to the discharge circuit or to another circuit, such as the drainage, but, since they are connected to each other, do not determine any propelling action.

In the simplified solution shown in FIG. 10, fractions of ¼ of piston displacement can be obtained with good results of working regularity. The fluid is allowed to flow to 24, 18, 12, 6 cylinders respectively, thus correspondingly obtaining the full piston displacement, ¾, ½, ¼ of piston displacement. Therefore, with an equal pressure and an equal fluid flow rate, different values of torque and speed can be obtained. Said function is also necessary in the drilling rotary applications, in which, according to the technologies used and to the features of the ground, the torques and the speeds have to be adjusted within a very wide operating range.

Figure 11:
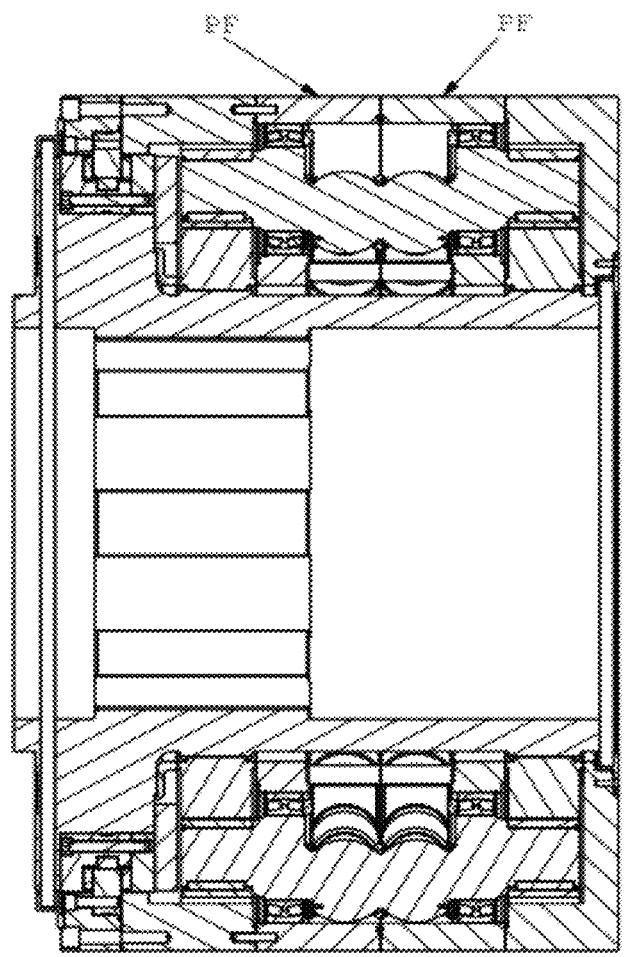
FIG. 11 shows a radial section of the motor of FIG. 10.

In the tangential motors installed on ordinary gearing, the fixed part PF of the driving body supports the eccentric shafts arranged in a planet position. Inside the driving body there is the annular rotatory part PR, whose rotation axis R is that of the machine (not shown in FIG. 11). Sliding means are provided between the fixed part and the rotatory part and comprise two rings DCR and DCF, which are connected to the respective rotatory and fixed parts by means of dragging pins.

Therefore, they are only able to slide axially. These discs are provided with grooves featuring precise geometries, which allow the different phases for feeding the fluid to the propelling members to take place and make sure that the sliding between each other takes place with an appropriate hydrostatic balance, thus guaranteeing, in each rotation moment, the contact in contact areas X indicated in FIGS. 12A and 12B and the seal against the leak of fluid. These distribution concepts are similar to those of radial motors with outer cams.

Between said discs and the respective parts there are provided sealing organs, which allow the possible minimum separation, due to possible dimensional micro-differences, from the respective parts.

Figure 12A:
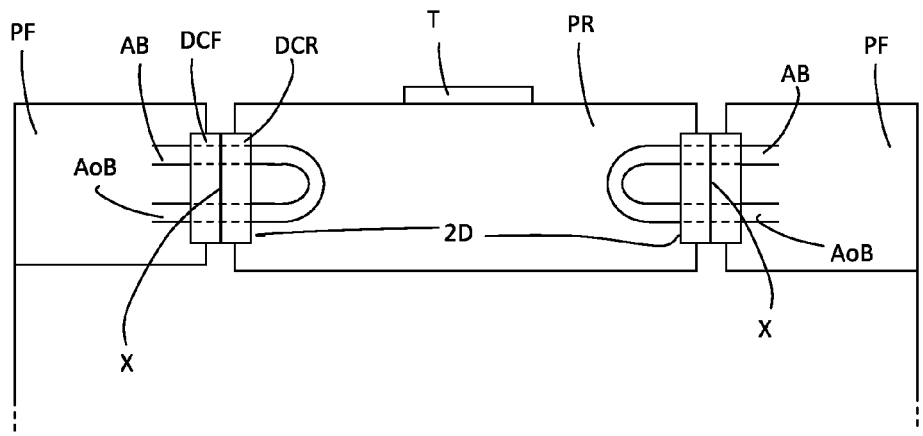
FIGS. 12a and 12b show a layout of the hydraulic distribution for the motor of FIGS. 10 and 11.

The object of the hydraulic distributor according to the present invention is to alternatively connect circuits "A" or "B" of the hydraulic feeding system (arranged in the fixed part of the motor) to the ducts connected to the propelling members according to alternate phases, which are arranged in the fixed part of the caps (for example, caps a10 of FIG. 4). With reference to FIG. 12A, the logic of the fluid connection is the following:

- A or B are ducts that are connected, respectively, to the pressure or discharge circuit of the hydraulic system; thus, some grooves are connected to "A", others are connected to "B".
- "AB" are ducts that are connected to the propelling members in the area of the caps, which, in some phases, are connected to "A" and, in other phases, are connected to "B".

The grooves obtained in the parts of rotatory contact disc DCR, together with the grooves obtained in the parts of fixed contact disc DCF, provide the alternate connection according to the different phases.

In order for this distributive logic to be carried out, there has to be a given gear ratio, which depends on the number of planets and has already been described above for the epicyclic gearing, between the rotation of planet shaft AS and the rotation of the ring of distributor PR.

The ordinary gearing works in a different manner. In particular, instead of the formula used for the epicyclic gearing:

$$z3/z2 = nsa^*x + 1,$$

wherein x is an integer=>1, the formula for the ordinary gearing is the following:

$$z3/z2 = nsa^*x - 1$$

wherein x is an integer=>1.

These restrictions concerning the gear ratios are an essential feature of the coaxial and annular rotatory distribution of these motors.

The inner part (FIGS. 13 A and B) of the annular rotatory part is provided with dragging devices, which are adapted for the purpose (plate connected to inner driving shaft).

In order to obtain both the hydraulic seal and the lowest sliding friction torque, a symmetric rotatory hydrostatic balance has to be created; this means that the static moment of the areas under pressure on one side has to be equal on the other side of the distributor.

In those tangential motors that present a full piston displacement or a symmetrically 50%-fractionized piston displacement, a central rotatory distribution (FIGS. 12A and 13A) is sufficient.

Figure 12B:
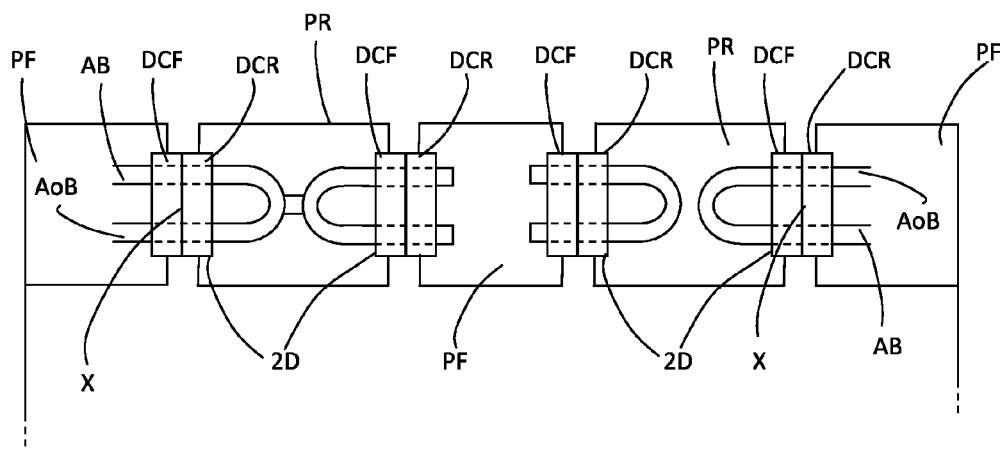

In those tangential motors presenting a piston displacement that has been developed on two levels, in case the fractionization is not symmetrical (e.g. full piston displacement on one side and ½ piston displacement on the other side; tot. ¼ of max. piston displacement), there have to be two distributions, which are arranged on two sides are separated by a wall, which is integral to driving body PF (FIGS. 12B and 13B).

Figure 13A:
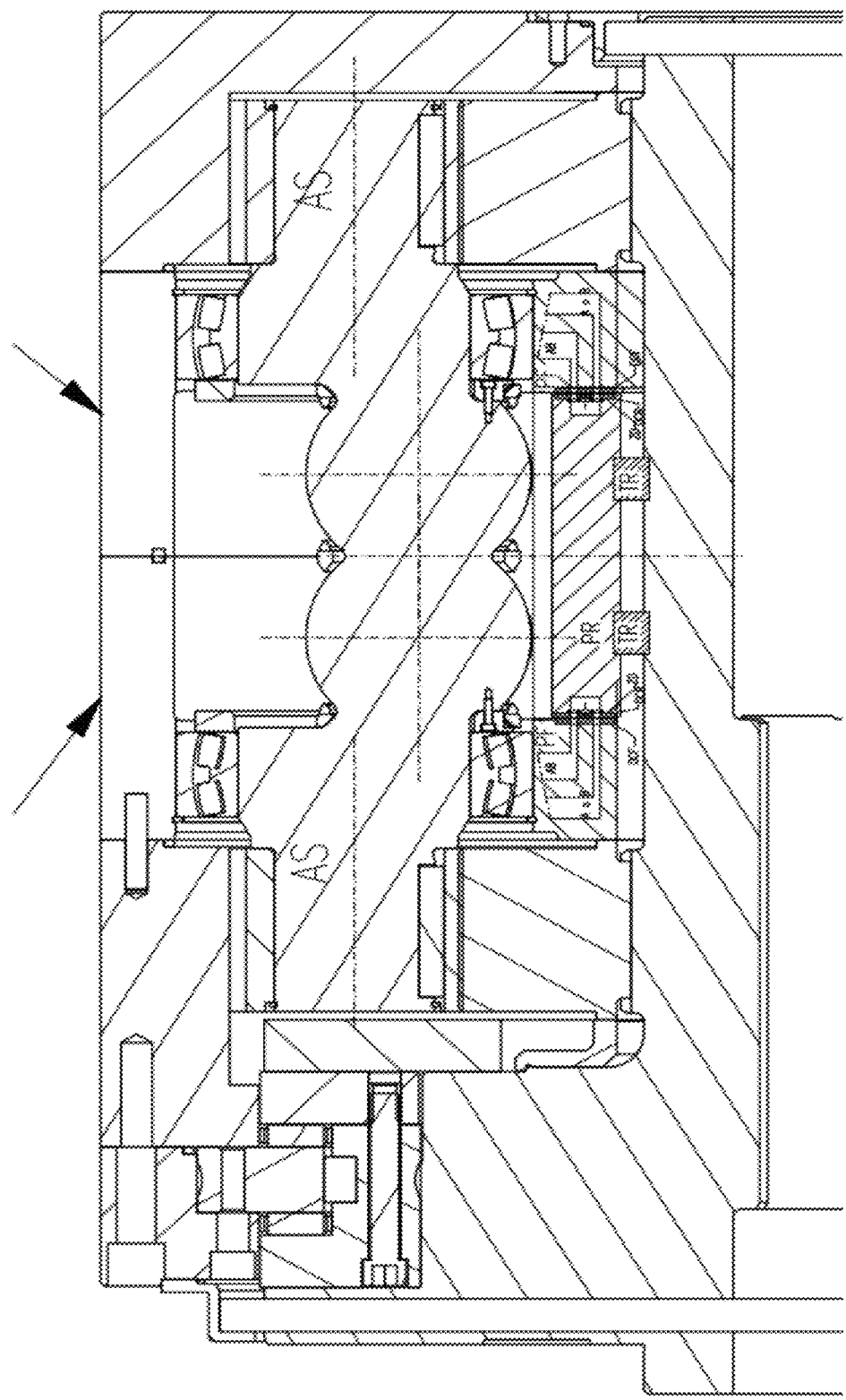

Therefore, in case the tangential motor is connected to an ordinary gearing, it is possible to use a partially rotatory distribution, such as the one shown in FIGS. 12A and 13A, provided that a full piston displacement is being used; otherwise, it is also possible to use a double distributor (FIGS. 12B and 13B), in case a fractionization of the piston displacement has been carried out, so that a first distributor presents, on the opposite sides of the sliding areas (indicated with "X"), the same pressures (e.g. delivery pressures), while the second distributor presents, on the opposite sides of the sliding areas, pressures that are equal to each other but different from the previous ones (e.g. discharge pressures). In this way, symmetry and hydrostatic balance are guaranteed.

The invention claimed is:

1. Hydraulic motor with tangential pistons acting on eccentric shafts arranged in a planet position with respect to a driven shaft, comprising:
    a driving body including 3 or more shafts arranged in a planet position and, in a tangential position thereto, two for each shaft, of pistons, cylinders and associated organs, into which, through a cavity with angular geometry defined in contact with the fixed part of the motor, a pressurized hydraulic fluid is inserted generating an axial thrust, which, by reacting on fixed parts also arranged in a planet position alternated with the shafts, produces a torque on the planet eccentrics wherein hydraulic distribution devices are at least partially rotatory with respect to driving means;
    wherein on both longitudinal ends, to two toothed gears, an outer gear with inner toothing as fixed part and an inner gear with outer toothing as driven gear, which, by meshing with the driving planet shafts, build a planetary gearing and transmit the torque to at least one between the driving planet carrier body and the inner driven gears.

2. Hydraulic motor with tangential pistons according to claim 1, which is associated on both longitudinal ends, to two braking devices of the negative or positive type, which are both provided with hydraulic cylinders in one direction and elastic striker means in the other direction, which simultaneously act on a disc-carrier structure anchored to the driving planet carrier body and on the discs and counterdiscs arranged as planets of the gearing, to determine a multiple and relative braking action in the gearing.

3. Hydraulic motor with tangential pistons according to claim 1, wherein a hydraulic distribution assembly is arranged in a planet position and determines the connection, during the expansion phase of the propulsion, to the hydraulic feeding circuit under pressure and, during the shrinkage phase, to the discharge circuit.

4. Hydraulic motor with tangential pistons according to claim 1, wherein the cylinders and the corresponding pistons are arranged on at least two parallel levels, and wherein each eccentric shaft is provided with two spherical seats, one coplanar to each cylinder level, which are adapted to receive the thrust of the cylinders, and wherein the devices for the distribution of the fluid to said pistons are able to selectively feed the pressurized fluid only to some of said cylinders, to determine a fractionization of the piston displacement of the motor.

5. Hydraulic motor with tangential pistons according to claim 1, wherein, when the flow of pressurized/discharge fluid is supplied in a separate manner to given fractions of thrust cylinders, different piston displacements are obtained from the same motor.

6. Rotation head or rotary for hydraulic drilling machines comprising one or more hydraulic motors according to claim 1, which is adapted to cause the rotation of bars and digging tools.

7. Hydraulic motor with tangential pistons according to claim 1, wherein the relative angular position of the eccentricities the shafts is in phase at 0 degrees.

8. Hydraulic motor with tangential pistons acting on eccentric shafts arranged in a planet position with respect to a driven shaft, comprising:
   a driving body including 3 or more shafts arranged in a planet position and, in a tangential position thereto, two for each shaft, of pistons, cylinders and associated organs, into which, through a cavity with angular geometry defined in contact with the fixed part of the motor, a pressurized hydraulic fluid is inserted generating an axial thrust, which, by reacting on fixed parts also arranged in a planet position alternated with the shafts, produces a torque on the planet eccentrics wherein hydraulic distribution devices are at least partially rotatory with respect to driving means;
   wherein on both longitudinal ends, to two toothed gears, an inner gear with outer toothing as fixed part and an outer gear with inner toothing as driven gear, which, by meshing with the driving planet shafts, build a planetary gearing and transmit the torque to both the driving planet carrier body and the outer driven gears.

9. Hydraulic motor with tangential pistons acting on eccentric shafts arranged in a planet position with respect to a driven shaft, comprising:
   a driving body including 3 or more shafts arranged in a planet position and, in a tangential position thereto, two for each shaft, of pistons, cylinders and associated organs, into which, through a cavity with angular geometry defined in contact with the fixed part of the motor, a pressurized hydraulic fluid is inserted generating an axial thrust, which, by reacting on fixed parts also arranged in a planet position alternated with the shafts, produces a torque on the planet eccentrics wherein hydraulic distribution devices are at least partially rotatory with respect to driving means;
   wherein on one single side, to one or more toothed gears, an outer gear with inner toothing and/or an inner gear with outer toothing, which, by meshing with the driving shaft arranged in a planet position, build a gearing of the ordinary type with a fixed shaft-carrier body and driven toothed gears, and wherein said hydraulic distribution devices are located in an inner annular portion of said planet carrier body.

10. Hydraulic motor with tangential pistons according to claim 9, wherein one or more braking assemblies of the negative or positive type, which are arranged in a planet position, are provided with cylinder, springs, discs, and counterdiscs, and are connected to each other, by stiffening, with a central disc-carrier ring.

11. Hydraulic motor with tangential pistons according to claim 9, wherein the distribution devices are two-hydrostatically balanced devices with respect to one another, arranged on opposite sides of the driving body, and are separated by a wall integral to the driving body.

* * * * *